Sept. 13, 1955  C. E. ANDERSHOCK  2,717,521
TRANSMISSION FOR MINE VEHICLES
Filed Feb. 18, 1953  4 Sheets-Sheet 1
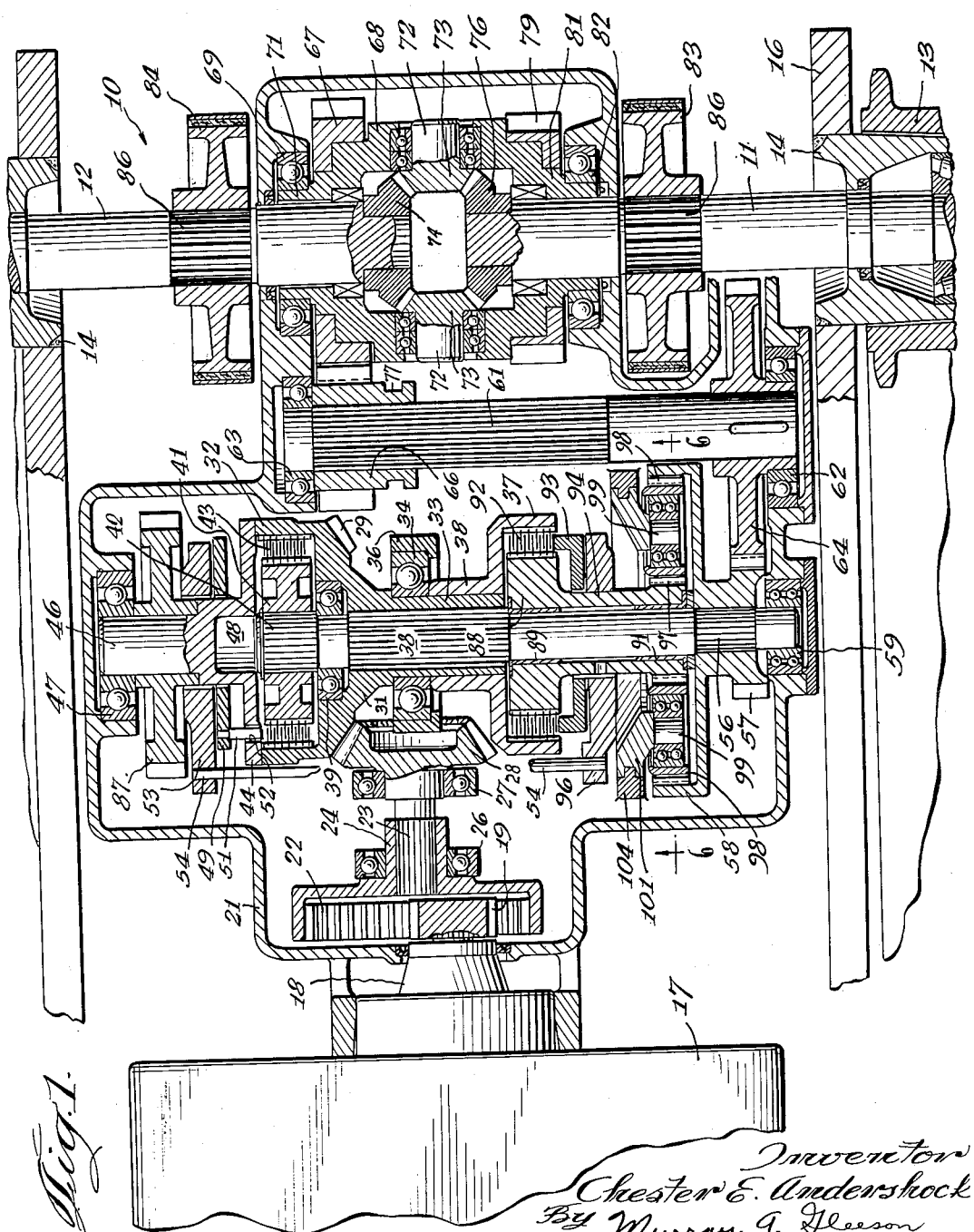

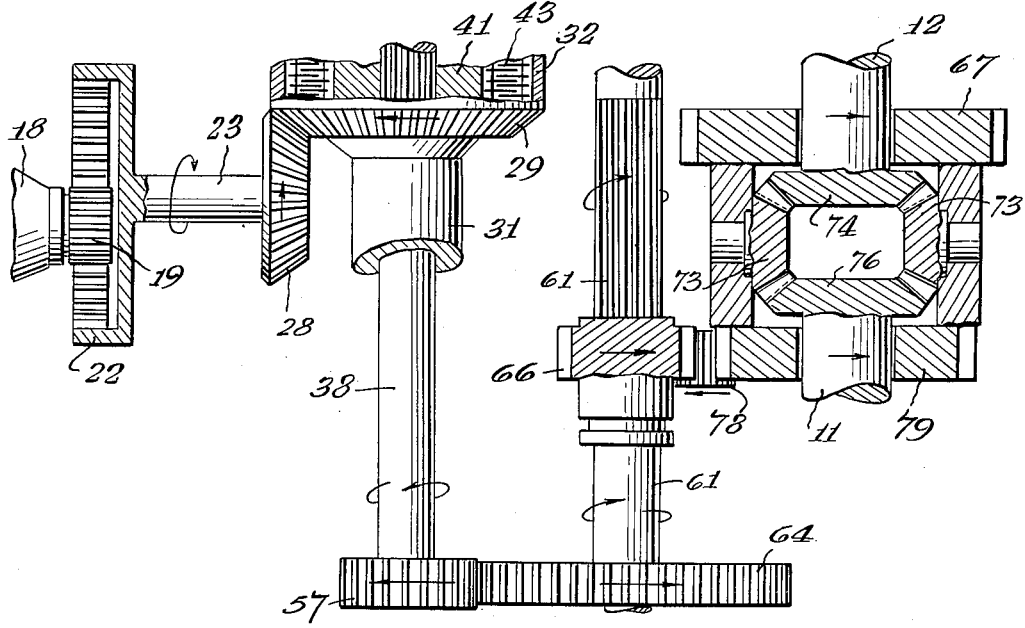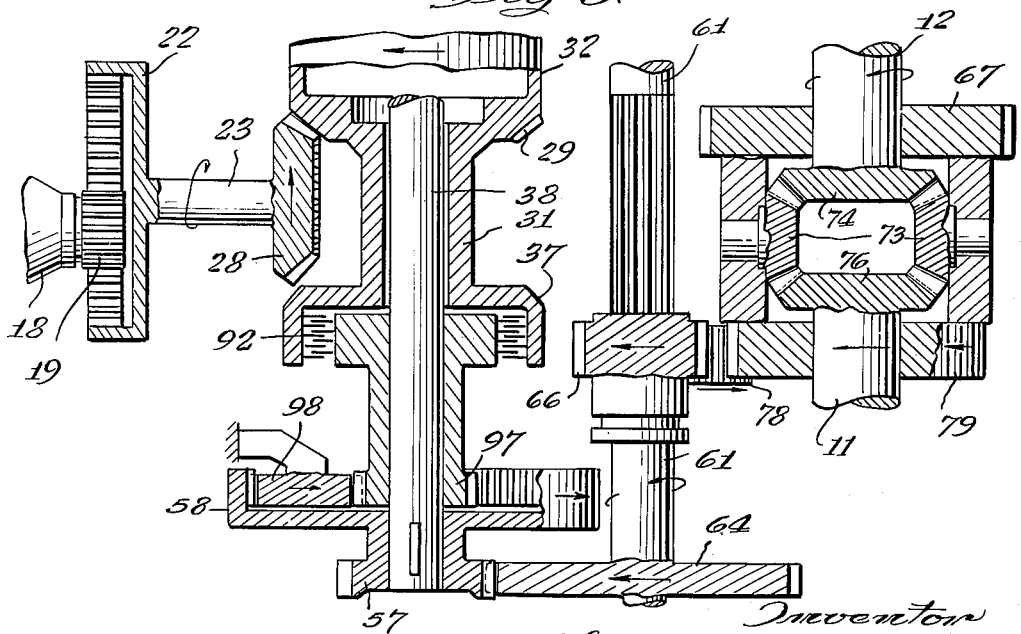

Sept. 13, 1955   C. E. ANDERSHOCK   2,717,521
TRANSMISSION FOR MINE VEHICLES
Filed Feb. 18, 1953   4 Sheets-Sheet 3

Inventor
Chester E. Andershock
By Murray A. Gleeson
attorney

Sept. 13, 1955     C. E. ANDERSHOCK     2,717,521
TRANSMISSION FOR MINE VEHICLES Filed Feb. 18, 1953     4 Sheets-Sheet 4

Inventor
Chester E. Andershock
By Murray A. Gleeson
Attorney

United States Patent Office 2,717,521
Patented Sept. 13, 1955

2,717,521

TRANSMISSION FOR MINE VEHICLES

Chester E. Andershock, Chicago, Ill., assignor to Goodman Manufacturing Company, Chicago, Ill., a corporation of Illinois Application February 18, 1953, Serial No. 337,540

4 Claims. (Cl. 74—377)

This invention relates generally to power transmissions and more particularly to a transmission for a gathering and loading machine for a mine or the like.

Heretofore in gathering and loading machines provision has been made for a gathering head which swivels with respect to the main frame of the machine, so that the gathering head may move fragmented material from along the entire length of the working face.

The provision of crawler treads for tramming such machines gives them mobility not capable with the usual track mounted vehicles and it is entirely possible to steer the vehicle in the mine room so that the gathering head need not be swiveled in order to gather material from along the working face.

However, the provision of a fixed gathering head and the consequent need for alternate forward and reverse movement of the machine in spotting same in desired position in the mine room gives rise to problems of making the drive transmissions suitably flexible. To stop and reverse the drive motor it is not practicable because of the rotational inertia of the armature thereof, with the consequent extra time and extra demands in such stopping and reversing.

According to the present invention the drive transmission is made extremely flexible considering the mass of the components thereof, and it is possible to operate such a machine with a fixed, rather than a swiveling, gathering head with substantially the same efficiency and with greatly lower costs.

In carrying out the invention the drive motor is driven in the same rotational direction during forward and reverse and during low and high speed tramming of the machine. The drive motor is therefore arranged to give unidirectional rotation to a clutch housing mounted to rotate about a driving shaft also having unidirectional rotation. The clutch housing contains a pair of clutches, one of the clutches effecting a direct drive to a pinion driving a countershaft connected to a differential driving mechanism. The other clutch contained within the clutch housing is arranged to drive selectively an intermediate set of gears mounted in planetary relationship with the driving shaft, so that the pinion driving the countershaft is driven at reduced speed. The mechanism driving such countershafts selectively at low or high speeds, is constantly rotating in the same direction for either low or high speed of the countershaft so that the transition from one speed to the other is effected without the change in rotational inertia of such driving mechanism.

A feature of the invention resides in the provision of means for mounting the mechanism effecting low speed operation in such a fashion that the entire clutching and speed changing components thereof may readily be removed from the vehicle with a minimum of disassembly in the field.

Another feature of the invention resides in the provision of means for mounting the intermediate gears effecting the change to low speed operation, so that upon the change from one speed to another speed such change is accompanied by a minimum of shock to the mechanism.

Another important and salient feature of the mechanism resides in the provision of a reversing differential train driving the crawler treads of such vehicle, so that a simple and effective transition is made from operation in the forward direction to operation in the reverse direction without the occurrence of shock to the transmission.

With the foregoing consideration in mind, it is a principal object of the invention to provide a new and improved vehicle transmission wherein the rotational inertia of the drive motor and the parts of the transmission are not greatly changed irrespective of the direction of operation of the vehicle and the speed at which it is operated by said transmission.

Other objects and important features of the invention will be apparent from the study of the following specification taken with the drawings which together show a preferred embodiment of the invention and what is now considered to be the best mode of practicing the principles thereof. Other embodiments of the invention may be suggested to those having the benefit of the teachings herein, and it is therefore intended that such other embodiments be reserved, especially as they fall within the purview of the claims subjoined.

In the drawings:

Fig. 1 is a horizontal sectional view through an improved transmission according to the present invention, showing the drive motor therefore and the crawler treads of a mine vehicle operated thereby;

Fig. 2 is a more or less schematic view of the driving components of the transmission shown in Fig. 1, showing the condition obtaining when driven in the forward direction at high speed;

Fig. 5 is a view similar to Fig. 3 showing the condition obtaining when the transmission is driven in reverse direction at low speed;

Figure 3:
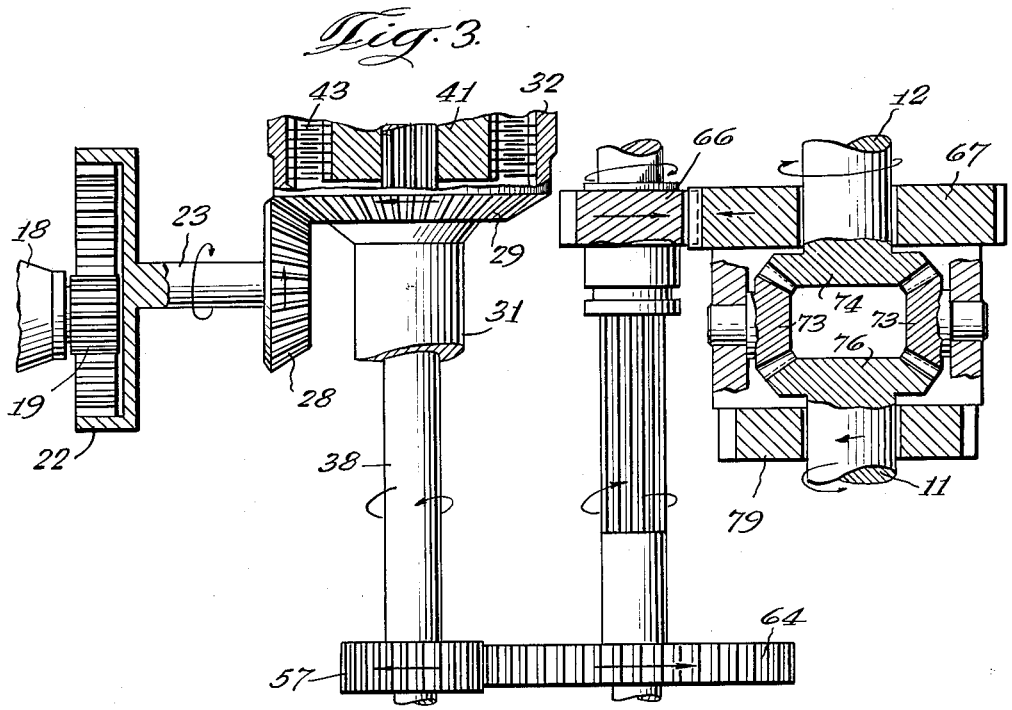
Fig. 3 is a view similar to Fig. 2, showing the condition obtaining when the transmission is driven in reverse direction at high speed.

Referring now particularly to Fig. 1 of the drawings, the improved transmission according to the present invention is denoted generally by the reference numeral 10 and is shown as providing power to a pair of drive shafts 11 and 12 connected to drive crawler tread sprockets 13 of a gathering and loading machine, such as is employed in mining underground. The shafts 11 and 12 are journalled near the outer extremities thereof in suitable bearings 14 which are retained within a crawler tread supporting frame 16.

Power is supplied to drive the shafts 11 and 12 through the medium of the transmission 10 by means of a prime mover or electric motor 17 supported upon a machine frame, not shown. The prime mover 17 has a drive shaft 18 having a pinion 19 at the end thereof which extends within a transmission housing 21, also supported upon the vehicle frame. The pinion 19 meshes with an internal ring gear 22 of a shaft 23 on a hub 24 of the ring gear 22. The hub 24 and the shaft 23 are supported within the housing 21 on bearings 26 and 27 respectively.

A bevel drive pinion 28 is mounted upon the shaft 23 and meshes at all times with a bevel gear 29 formed on a double clutch housing 31, one part of said clutch housing terminating in a clutch housing bell 32. A hub 33 is formed integrally with the housing bell 32, and is mounted in bearing 34 supported on a pillowblock 36 within the housing 21. An opposite housing bell 37 has a hub 38 which is splined to the outside of the hub 33, so that the two clutch housing bells 32 and 37 rotate together as a unit at all times.

A shaft 38 is arranged to be supported in part upon a bearing 39 retained within the bell housing 32 and is also arranged to rotate with the bell housing 32 by means of a multi-disc clutch consisting of a carrier 41 splined at 42 to the shaft 38. The carrier 41 is splined along the outer periphery thereof, and the bell 32 is splined at the inner periphery thereof so as to support interleaved clutch discs 43. The clutch comprising the carrier 41 and the discs 43 is contained within the cavity defined by the bell 32, and a closure plate 44 secured to the bell 32 and having a stub-shaft 46 which is supported upon bearings 47 mounted in a wall of a housing 21. One end of the shaft 38 is held within a bore 48 in the stub shaft 46 so that the shaft 38 is additionally supported thereby.

Means are provided for causing clutching engagement between the shaft 38 and the double clutch housing 31, and to this end the stub shaft 46 carries a pressure applying plate 49 having pressure applying pins 51 extending therefrom which extend through openings 52 in the closure plate 44. Movement is provided to the pressure applying plate by a yoke 53 which is also supported upon the stub shaft 46, but not adapted to rotate therewith. The yoke 53 has a shifter rod 54 extending therefrom which may be manipulated from without the housing 21 by either hydraulic or manual means.

One end of the shaft 38 is splined at 56 to a pinion 57 which is formed integrally with a large diameter internally toothed ring gear 58, for a purpose as will appear as this specification proceeds. The end of the shaft 38 adjacent the pinion 57 is journalled in a bearing 59 retained in a wall of the housing 21.

A countershaft 61 is journalled on bearings 62 and 63 contained within spaced walls of the housing 21 and has fast thereto a gear 64 meshing with the pinion 57. A pinion 66 is slidably splined to the shaft 61 and meshes with a driving gear 67 fast on a double differential spider 68 supported on bearings 69 and 82 held in spaced walls of the housing 21. The spider 68 has a hub 71 which encircles the shaft 12 and a hub 81 which encircles the shaft 11. The spider 68 supports stub shafts 72 carrying differential bevel pinions 73 which mesh with bevel pinions 74 and 76 fast to the inner ends of the drive shafts 12 and 11 respectively.

The splined pinion 66 has an annular groove 77 for a shifter yoke carrying a shifter rod, not shown, so that the pinion 66 may be moved from engagement with the driving gear 67 and into engagement with a reach gear 78, see Fig. 2, which meshes with a driving gear 79 fast to the hub 81 of the cage 68.

It will be seen from the descriptions thus far, and with particular reference now to Figs. 2 and 3, that the prime mover 17 will be drivably connected to the shafts 11 and 12 through the medium of bevel gears 28 and 29, the clutch 43, the gears 57 and 64, the direction of rotation of the shafts 11 and 12 being determined by the position of the pinion 66 slidably splined to the shaft 61. In the position shown in Fig. 2, the shafts 11 and 12 will be driven in the forward direction, while when the pinion 66 is in the position shown in Figs. 1 and 3 the shafts 11 and 12 will be driven in the reverse direction at substantially the same speed, any difference in speed thereof being in accordance with the difference in pitch diameter between the driving gears 67 and 79.

As seen also with reference to Figs. 1 and 3, the shafts 11 and 12 each carry drums 83 and 84 which are splined thereto as at 86. The brake drums 83 and 84 may be arranged with suitable friction devices to prevent the shafts 11 and 12 from unintended movement thereof and unintended movement of the crawler tread sprockets 13.

As seen also in Fig. 1 the stub shaft 46 has fast thereto an auxiliary gear 87 which may be employed to drive other mechanism from the prime mover 17. The provision of such auxiliary gear 87 forms no part of the present invention, however.

The opposite clutch housing bell 37 is arranged to afford a clutching connection with a driven member 88 supported on bushings 89 and 91 upon the shaft 38. The driven member 88 and the bell housing 37 carry friction discs 92 which are brought into engagement to afford a driving connection between the bell 37 and the driven member 88 through the medium of a pressure plate 93 supported upon a hub 94 of the driven member 88. The shifter rod 54 is fixed to a shifter yoke 96 to move the pressure plate 93 against the friction discs 92.

Figure 7:
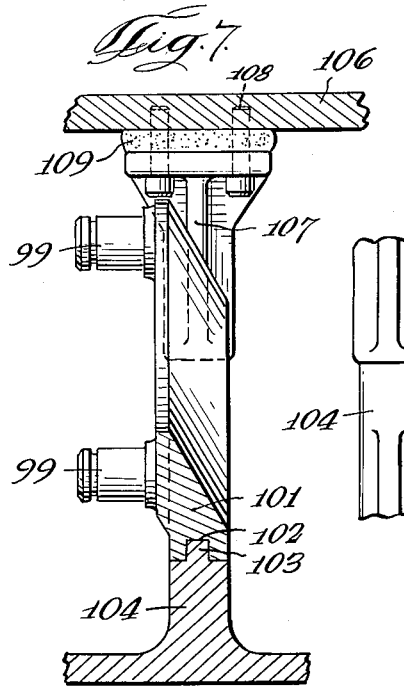
Fig. 7 is a view taken along the line 7—7 of Fig. 6 looking in the direction of the arrows showing a carrier supporting pinions providing for operation at low speed and showing means for mounting the pinion supporting cage, so that the shock thereon is absorbed upon change from one speed condition to another.

The hub 94 has a pinion 97 thereon which meshes with pinions 98 mounted on stub shafts 99 extending from a carrier or spider 101. As seen more clearly in Fig. 7, the spider 101 has an annular groove 102 and is adapted to be mounted on an annular rib 103 formed as part of a support standard 104 formed integrally with the housing 21 and extending upward from the bottom thereof.

Figure 6:
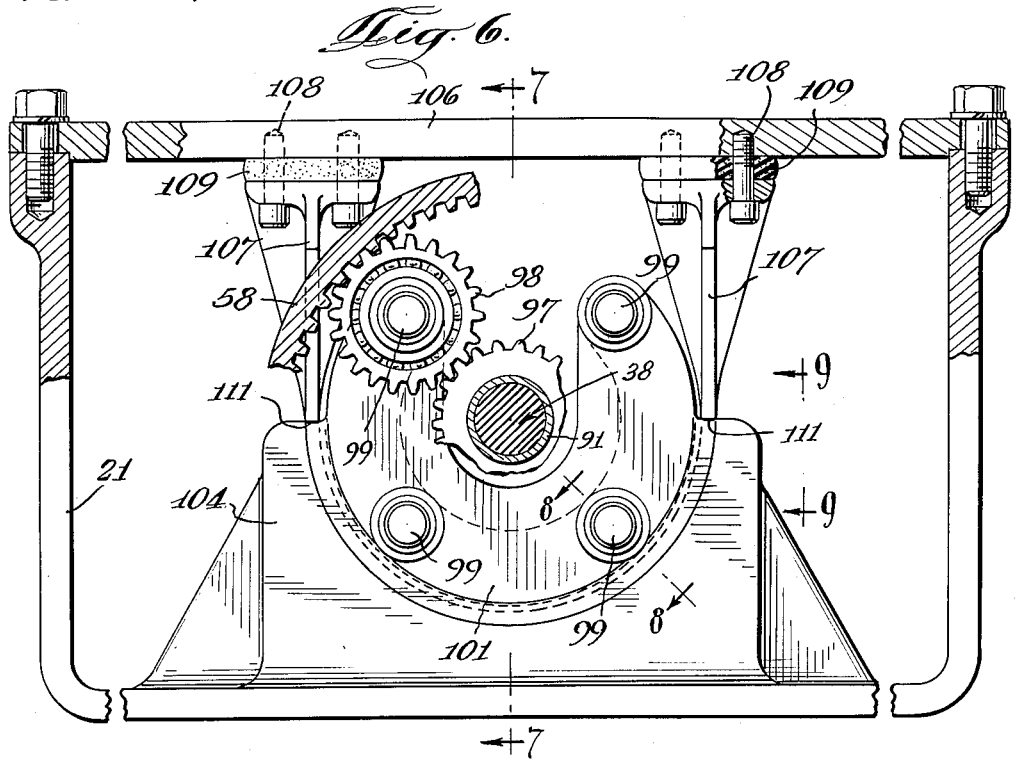
Fig. 6 is a view taken substantially along the lines 6—6 of Fig. 1, showing the details of construction of a back driving train for effecting operation at low speed in either the forward or reverse direction.

It will be noticed from Fig. 6 that the annular rib 103 describes 180° of central angle, while the annular slot 102 formed on the spider 101 likewise describes 180° of central angle, the purpose being that the spider 101 may be dropped into position upon the standard 104, being positioned thereon by means of the groove 102 and the rib 103.

Figures 8, 9:
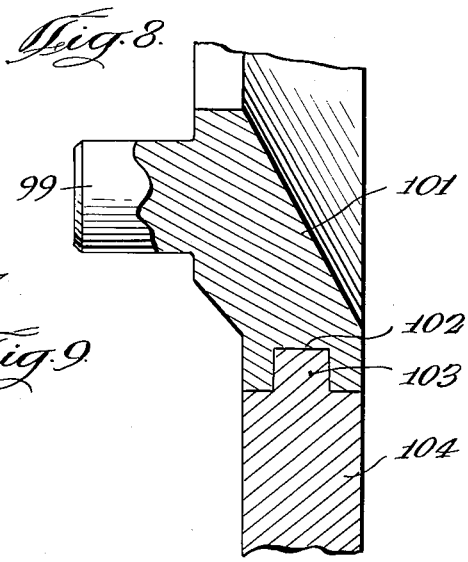
Fig. 8 is a section taken along the line 8—8 of Fig. 6 looking in the direction of the arrows and showing the manner in which the pinion supporting cage is mounted.
Fig. 9 is a view taken along the line 9—9 of Fig. 6 looking in the direction of the arrows, showing the manner in which the cage supporting the pinions is restrained against rotative movement.

Means are provided for restraining the spider 101 against rotative movement occasioned by the application of torque to the pinion 97, and to this end the housing 21 has a top cover plate 106 having keepers 107 extending downward from the inner side thereof. The keepers 107 are screwed to the underside of the top cover plate 106 by cap screws 108, and a pad of resilient material 109 is interposed between the keepers 107 and the underside of the top cover plate. The keepers 107 extend downward in the manner shown in Figs. 6 and 9 to engage shoulders 111 formed on the spider 101. The keepers 107 thus restrain the spider 101 against rotation upon the application of a torque to the pinion 97, the resilient pads 109 absorbing any shock occasioned by the application of such torque.

Figure 4:
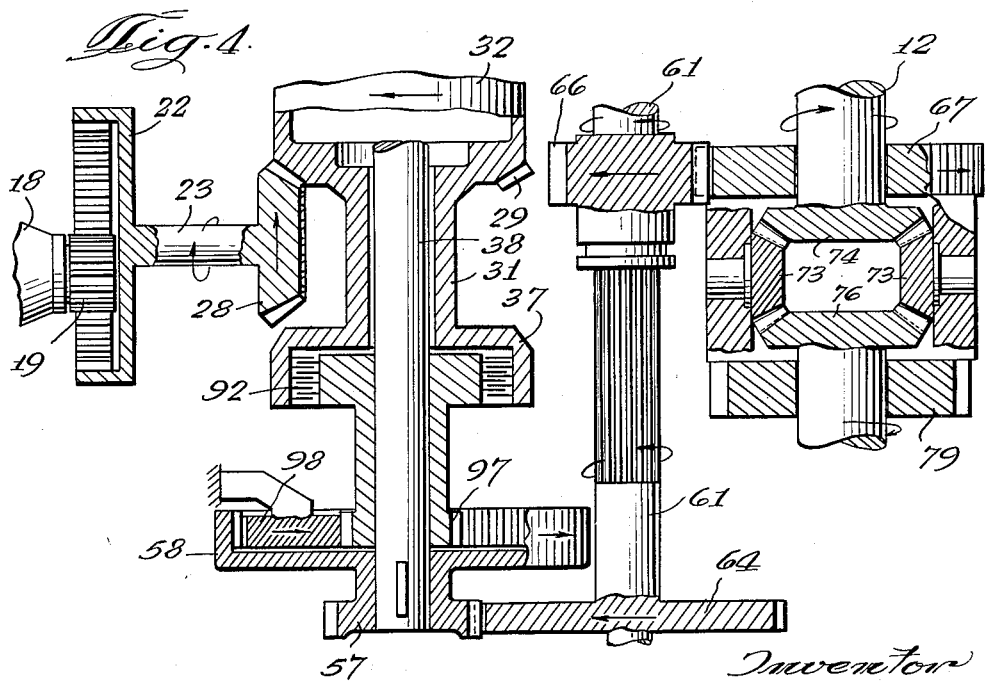
Fig. 4 is a view similar to Fig. 2 showing the condition obtaining when the transmission is driven at low speed in a forward direction.

When the clutch 92 is engaged, the clutch 43 is of course disengaged, and a driving connection will be afforded from the bell housing 37 to the driven member 88 to drive the pinion 97 and the pinions 98, to drive the internal ring gear 58 and the pinion 57 turning therewith at reduced speed. As with the example described with reference to Figs. 2 and 3, the shafts 11 and 12 may be driven at reduced speeds in the forward or reverse direction by shifting of the spline pinion 66 as shown in Figs. 4 and 5.

It will be noted from the foregoing that the transmission according to the present invention presents many advantages. All of the mechanism rotating at relatively high speeds, that is the clutch housings 32 and 37, the prime mover 17 and the drive shafts 18 and 23 are not required to change their rotational inertia for any speed or direction condition obtaining of the driven shafts 11 and 12. In changing from high speed to low speed the internal ring gear 58 and the pinion 57 are the only elements connected to the prime mover 17 which are required to change their speeds substantially, and in such change of speed the internal ring gear 58 already has a measure of rotational inertia. Conversely, in moving from low speed to high speed the internal ring gear 58 is already rotating, and merely changes to the increased speed upon engagement of the clutch 43. In such change of speed the spider 101 is resiliently cushioned to avoid the occurrence of shocks during such change in speed.

A transmission of the kind described herein is especially advantageous in a fixed gathering head type of loading machine. For example, such a machine is trammed at high speed toward material dislodged from a mine face. As the gathering mechanism removes the material, the machine may be trammed at low speed. When the gathering operation is completed at that point, it can be trammed in a reverse direction at high speed, if desired. All of such movements take place with the drive motor turning at constant speed, no time being lost by stopping and reversing the drive motor.

While the invention has been described in terms of a preferred embodiment thereof, it is not intended that the invention be limited by the embodiment shown herein described, nor otherwise by the terms of the claims here appended.

I claim as my invention:

1. In a drive transmission, a rotating clutch housing driven from a prime mover, a clutch housing bell disposed at each end of said clutch housing, a shaft mounted within and coaxially of said clutch housing so as to turn selectively with said clutch housing and selectively with respect thereto, a driving pinion mounted at one end of said shaft, a driven member mounted on said shaft, means housed within one of said clutch housing bells for providing a clutching connection between said clutch housing and said driven member, a second driven member mounted on said shaft but adapted to turn relative thereto, means housed within the other of said clutch housing bells for providing a clutching connection between said clutch housing and said second driven member, a selector for causing both of said clutching means to operate selectively, a pinion mounted on said second driven member to turn therewith, an internal ring gear mounted to turn with said shaft, a support for at least one pinion meshing with the pinion on said second driven member and meshing with said internal ring gear, a standard mounting said support thereon, said support having an annular outer periphery and said standard having an annular inner periphery, both of said peripheries embracing not more than 180° of central angle, whereby said support may be readily removed from said standard, means for restraining said support against rotative movement, and means for cushioning said support upon the occurrence of torque thereagainst upon operation of said clutching means selectively.

2. In a drive transmission, a rotating clutch housing driven from a prime mover, a clutch housing bell disposed at each end of said clutch housing, a shaft mounted within and coaxially of said clutch housing so as to turn selectively with said clutch housing and selectively with respect thereto, a driving pinion mounted at one end of said shaft, a driven member mounted on said shaft, means housed within one of said clutch housing bells for providing a clutching connection between said clutch housing and said driven member, a second driven member mounted on said shaft, but adapted to turn relative thereto, means housed within the other of said clutch housing bells for providing a clutching connection between said clutch housing and said second driven member, a selector for causing both of said clutching means to operate selectively, a pinion mounted on said second driven member to turn therewith, an internal ring gear mounted to turn with said shaft, a support for at least one pinion meshing with the pinion on said second driven member and meshing with said internal ring gear, means for restraining said support against rotative movement, and means for cushioning said support upon the occurrence of torque thereagainst upon operation of said clutching means selectively.

3. In a drive transmission, a rotating clutch housing driven from a prime mover, a clutch housing bell disposed at each end of said clutch housing, a shaft mounted within and coaxially of said clutch housing so as to turn selectively with said clutch housing and selectively with respect thereto, a driving pinion mounted at one end of said shaft, a driven member mounted on said shaft, means housed within one of said clutch housing bells for providing a clutching connection between said clutch housing and said driven member, a second driven member mounted on said shaft but adapted to turn relative thereto, means housed within the other of said clutch housing bells for providing a clutching connection between said clutch housing and said second driven member, a pinion mounted on said second driven member to turn therewith, an internal ring gear mounted to turn with said shaft, a support for at least one pinion meshing with the pinion on said second driven member and meshing with said internal ring gear, means for restraining said support against rotative movement, and means for cushioning said support upon the occurrence of torque thereagainst upon selective operation of said clutch means.

4. In a drive transmission, a rotating clutch housing driven from a prime mover, a shaft mounted within said housing arranged to turn selectively with said housing and to turn selectively with respect thereto, a driving pinion mounted on said shaft, a driven member mounted on said shaft, means affording a clutching connection between said clutch housing and said driven member, a second driven member mounted on said shaft but adapted to turn relative thereto, means affording a clutching connection between said clutch housing and said second driven member, a selector for causing said clutching means to operate selectively, a pinion mounted on said second driven member to turn therewith, an internal ring gear mounted to turn with said shaft, a support for at least one pinion meshing with the pinion on said second driven member and meshing with said internal ring gear, a standard mounting said support thereon, said support having an annular outer periphery and said standard having an annular inner periphery, both of said peripheries embracing not more than 180° of central angle, whereby said support may readily be removed from said standard, means for restraining said support against rotative movement, and means for cushioning said support upon the occurrence of torque thereagainst upon operation of said clutching means selectively.

References Cited in the file of this patent

UNITED STATES PATENTS

| 964,382 | Bradbury | July 12, 1910 |
| 1,629,518 | Martin | May 24, 1927 |
| 1,796,352 | Watson | Mar. 17, 1931 |
| 1,846,879 | Kurth | Feb. 23, 1932 |
| 1,864,348 | Given | June 21, 1932 |
| 2,077,663 | Batters | Apr. 20, 1937 |
| 2,247,839 | Halford | July 1, 1941 |